US006785654B2

(12) United States Patent
Cyr et al.

(10) Patent No.: US 6,785,654 B2
(45) Date of Patent: Aug. 31, 2004

(54) DISTRIBUTED SPEECH RECOGNITION SYSTEM WITH SPEECH RECOGNITION ENGINES OFFERING MULTIPLE FUNCTIONALITIES

(75) Inventors: James Cyr, Clinton, CT (US); Andrew MacGintie, Roxbury, CT (US); Martin Hold, Fairfield, CT (US); Channell Greene, Bpt, CT (US); Regina Kuhnen, Trumbull, CT (US)

(73) Assignee: Dictaphone Corporation, Stratford, CT (US)

( * ) Notice: Subject to any disclaimer, the term of this patent is extended or adjusted under 35 U.S.C. 154(b) by 0 days.

(21) Appl. No.: 09/997,220

(22) Filed: Nov. 30, 2001

(65) Prior Publication Data

US 2003/0105623 A1 Jun. 5, 2003

(51) Int. Cl.[7] ............................................. G10L 15/18
(52) U.S. Cl. .................................... 704/270.1; 704/257
(58) Field of Search .............................. 704/6, 7, 8, 9, 704/10, 251, 252, 253, 255, 257, 270.1, 276, 235, 260

(56) References Cited

U.S. PATENT DOCUMENTS

| | | | |
|---|---|---|---|
| 5,179,627 A | 1/1993 | Sweet et al. ................... 395/2 |
| 5,333,275 A | 7/1994 | Wheatley et al. .......... 395/2.25 |
| 5,513,298 A | * | 4/1996 | Stanford et al. ............ 704/243 |
| 5,649,060 A | 7/1997 | Ellozy et al. .............. 395/2.87 |
| 5,727,950 A | 3/1998 | Cook, deceased et al. |
| 5,772,585 A | 6/1998 | Lavin et al. ................ 600/300 |
| 5,787,230 A | 7/1998 | Lee ........................... 395/2.44 |
| 5,799,273 A | 8/1998 | Mitchell et al. |
| 5,819,220 A | 10/1998 | Sarukkai et al. |
| 5,848,390 A | 12/1998 | Matsumoto ................. 704/260 |

(List continued on next page.)

FOREIGN PATENT DOCUMENTS

| | | |
|---|---|---|
| JP | 2000172483 | 6/2000 |
| JP | 2002091477 | 3/2002 |
| WO | WO 00/54252 | 9/2000 |

OTHER PUBLICATIONS

Elmasri, et al., "Fundamentals of database Systems", *The Benjamin Cummings Publishing Company, Inc.,* pp. 76–79.
Hundt, et al., "Speech Processing in Radiology, *Computer Applications*", *European Radiology, Eur. Radiol.* 9, pp. 1451–1456 (1999).
F. Jelinek, "Self–Organized Language Modeling for Speech Recognition", *Language Processing for Speech Recognition,* pp. 450–505.
Leggetter, et al., "Maximum Likelihood Linear Regression for Speaker Adaptation of Continuous Density Hidden Markov Models", *Computer Speech and Language* (1995) 9, pp. 171–185.
Neumeyer et al., "A Comparative Study of Speaker Adaptation Techniques", *ESCA Eurospeech '95, 4th European Conference on Speech Communication and Technology, Madrid,* Sep. 1995, pp. 1127–1130.
Shinoda, et al., "Unsupervised Adaptation Using Structural Bayes Approach", pp. 793–796.

(List continued on next page.)

*Primary Examiner*—Richemond Dorvil
*Assistant Examiner*—Abul K. Azad
(74) *Attorney, Agent, or Firm*—Howrey Simon Arnold & White, LLP; Anthony L. Meola

(57) ABSTRACT

A distributed speech recognition system includes a speech processor linked to a plurality of speech recognition engines. The speech processor includes an input for receiving speech files from a plurality of users and storage means for storing the received speech files until such a time that they are forwarded to a selected speech recognition engine for processing. Each of the speech recognition engines includes a plurality of servers selectively performing different functions. The system further includes means for selectively activating or deactivating the plurality of servers based upon usage of the distributed speech recognition system.

20 Claims, 3 Drawing Sheets

U.S. PATENT DOCUMENTS

| | | | |
|---|---|---|---|
| 5,884,262 A | 3/1999 | Wise et al. | |
| 5,893,134 A | 4/1999 | O'Donoghue et al. | 707/536 |
| 6,058,104 A | 5/2000 | Snelling et al. | |
| 6,064,957 A | 5/2000 | Brandow et al. | 704/235 |
| 6,076,059 A | 6/2000 | Glickman et al. | 704/260 |
| 6,081,780 A | 6/2000 | Lumelsky | |
| 6,094,635 A | 7/2000 | Scholz et al. | |
| 6,101,467 A * | 8/2000 | Bartosik | 704/235 |
| 6,122,613 A | 9/2000 | Baker | 704/235 |
| 6,122,614 A | 9/2000 | Kahn et al. | 704/235 |
| 6,125,284 A | 9/2000 | Moore et al. | |
| 6,195,641 B1 | 2/2001 | Loring et al. | 704/275 |
| 6,208,964 B1 | 3/2001 | Sabourin | 704/244 |
| 6,260,011 B1 | 7/2001 | Heckerman et al. | 704/235 |
| 6,263,308 B1 | 7/2001 | Heckerman et al. | 704/231 |
| 6,269,188 B1 | 7/2001 | Jamali | 382/229 |
| 6,282,652 B1 | 8/2001 | Scheifler | |
| 6,298,326 B1 | 10/2001 | Feller | 704/270 |
| 6,308,158 B1 | 10/2001 | Kuhnen et al. | 704/275 |
| 6,338,038 B1 | 1/2002 | Hanson | 704/500 |
| 6,366,882 B1 | 4/2002 | Bijl et al. | 704/235 |
| 2001/0020226 A1 | 9/2001 | Minamino et al. | 704/251 |
| 2001/0029452 A1 | 10/2001 | Chen | 704/251 |

OTHER PUBLICATIONS

Zick, et al., "Voice Recognition Software Versus a Traditional Transcription Service for Physician Charting in the ED", *American Journal of Emergency Medicine*, vol. 19, No. 4, Jul. 2001, pp. 295–298.

Astley, et al. "Customizable Middleware for Modular Distributed Software, Simplifying the development and maintenance of complex distributed software", Communication of the ACM, May 2001, vol. 44, No. 5, 1st paragraph p. 100, inset p. 101, last ½ of center column.

Liskov, Primitives for Distributed Computing, ??CS Lab, MIT, ACM SIG on Operating Systems, pp. 38, section 3.3, $2^{nd}$ paragraph; p. 35 $2^{nd}$ paragraph.

* cited by examiner

DISTRIBUTED SPEECH RECOGNITION SYSTEM WITH SPEECH RECOGNITION ENGINES OFFERING MULTIPLE FUNCTIONALITIES

BACKGROUND OF THE INVENTION

1. Field of the Invention

The invention relates to a distributed speech recognition system. More particularly, the invention relates to a distributed speech recognition system in which the speech recognition engines are provided with multiple functionalities from which an administrator may chose in optimizing the performance of the distributed speech recognition engine.

2. Description of the Prior Art

Recent developments in speech recognition and telecommunication technology have made automated transcription a reality. The ability to provide automated transcription is not only limited to speech recognition products utilized on a single PC. Large systems for automated transcription are currently available.

These distributed speech recognition systems allow subscribers to record speech files at a variety of locations, transmit the recorded speech files to a central processing facility where the speech files are transcribed and receive fully transcribed text files of the originally submitted speech files. As those skilled in the art will certainly appreciate, such a system requires substantial automation to ensure that all speech files are handled in an orderly and efficient manner.

Prior systems have relied upon a central processing facility linked to clusters of speech recognition engines governed by a speech recognition interface. In accordance with such systems, speech files enter the central processing facility and are simply distributed amongst the plurality of speech recognition clusters with no regard for the efficiency of the cluster to which the file is assigned or the ability of specific speech recognition engines to handle certain speech files. As such, many of the faster speech recognition engines linked to the central processing facility are oftentimes unused while other, slower, speech recognition engines back up with jobs to process.

These prior systems further include speech recognition engines which are permanently designated for the performance of specific functions. For example, speech recognition engines in accordance with prior art system are designated for the performance of either fluency analysis, speech recognition, adaptation, language model identification and word addition, regardless of the changing needs of the overall distributed speech recognition systems.

As those skilled in the art will certainly appreciate, static assignment of functionality as employed in prior distributed speech recognition systems is oftentimes not an effective way in which to use system resources. For example, upon the inception of a new distributed speech recognition system a great need exists for fluency analysis and adaptation as new users of the system will regularly start using the system. However, as the system becomes more established, more users are established and produce substantial speech files for recognition by the system while fewer new users are being added to the overall system. With the foregoing in mind, the specific resources required by a distributed speech recognition system is continually changing and statically defined functionalities limit the system's ability to perform in an optimal manner.

With the foregoing in mind, a need currently exists for a distributed transcription system capable of adapting as the required resources of the distributed speech recognition system change over time. The present system provides such a distributed speech recognition system.

SUMMARY OF THE INVENTION

It is, therefore, an object of the present invention to provide a distributed speech recognition system including a speech processor linked to a plurality of speech recognition engines. The speech processor includes an input for receiving speech files from a plurality of users and storage means for storing the received speech files until such a time that they are forwarded to a selected speech recognition engine for processing. Each of the speech recognition engines includes a plurality of servers selectively performing different functions. The system further includes means for selectively activating or deactivating the plurality of servers based upon usage of the distributed speech recognition system.

It is also an object of the present invention to provide a distributed speech recognition engine wherein the plurality of servers are selected from the group consisting of an acoustic adaptation logical server, a language model adaptation logical server, a speech recognition server, a language model identification server and a fluency server.

It is another object of the present invention to provide a distributed speech recognition engine wherein the means for activating or deactivating includes an administrator workstation.

It is a further object of the present invention to provide a distributed speech recognition engine including a speech engine monitoring agent monitoring usage of the plurality of speech recognition engines.

It is also an object of the present invention to provide a method for optimizing the operation of a distributed speech recognition system. The method is achieved by first linking a speech processor to a plurality of speech recognition engines, the speech processor including an input for receiving speech files from a plurality of users and storage means for storing the received speech files until such a time that they are forwarded to a selected speech recognition engine for processing. Each of the speech recognition engines is then provided with a plurality of servers performing different functions and the plurality of servers are selectively activated or deactivated based upon usage of the distributed speech recognition system.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
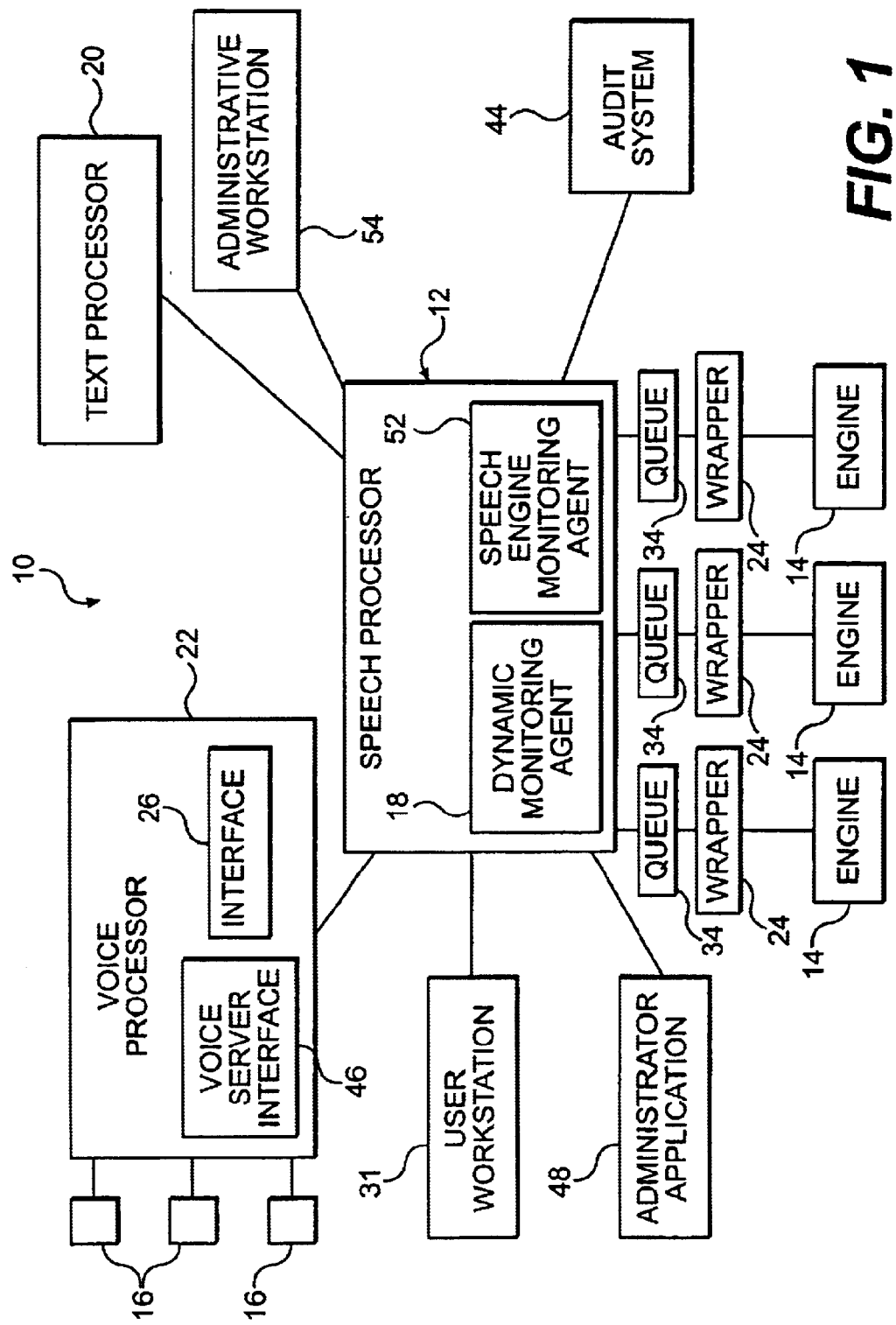
FIG. 1 is a schematic of the present system.
Figure 2:
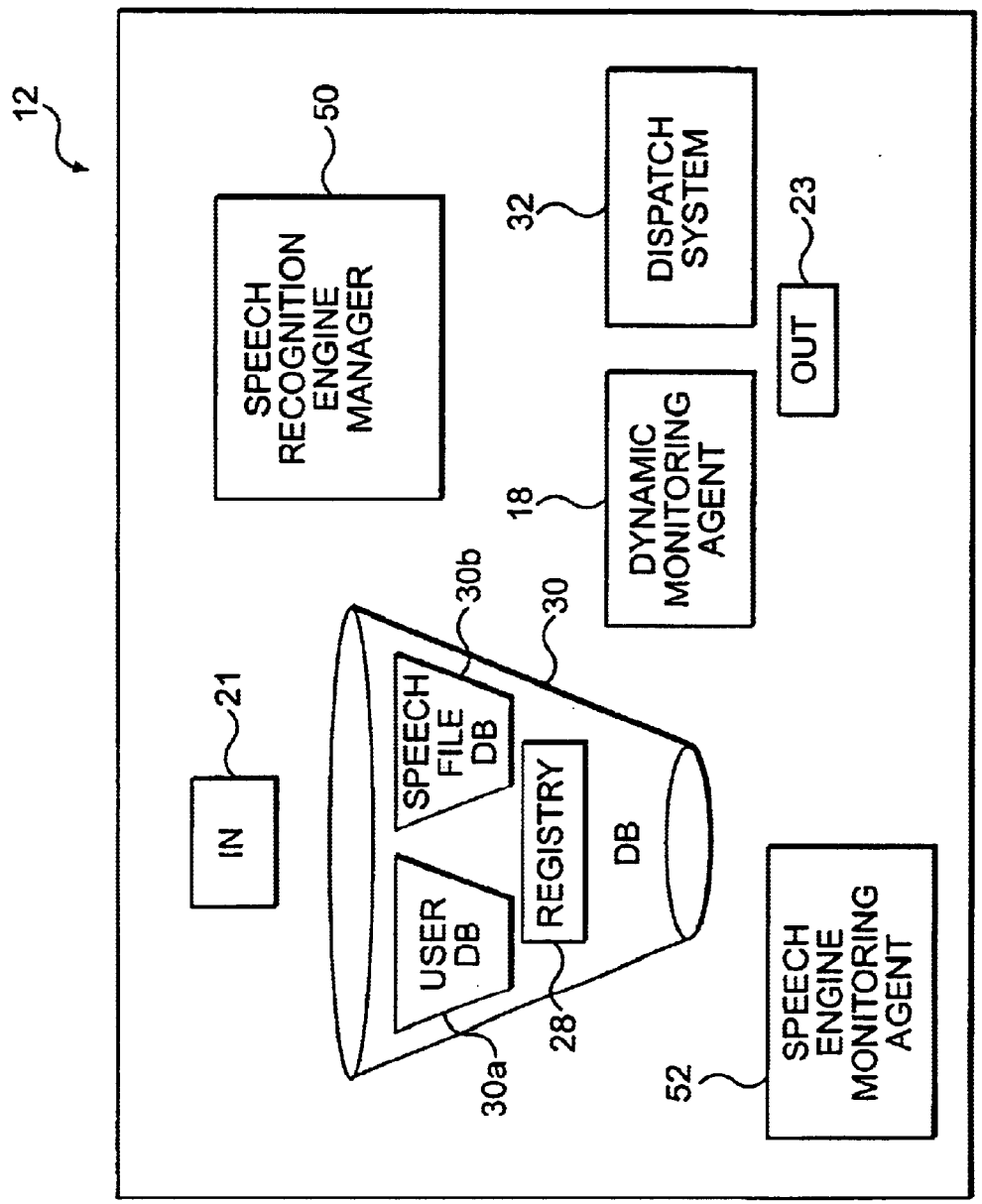
FIG. 2 is a schematic of the central speech processor in accordance with the present invention.
Figure 3:
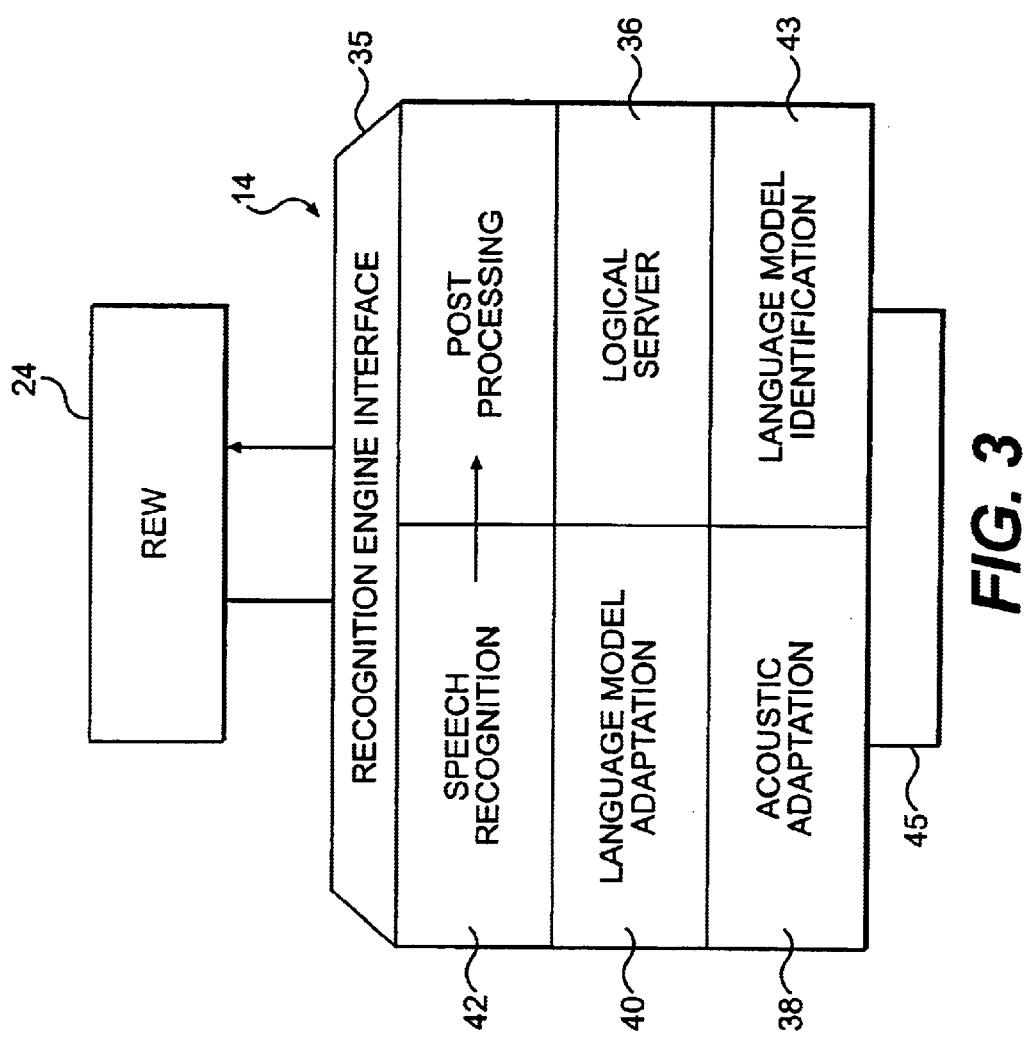
FIG. 3 is a schematic of the speech recognition engine wrapper and speech recognition engine in accordance with the present invention.

With reference to FIGS. 1, 2 and 3, a distributed speech recognition system 10 is disclosed. The system generally includes a central speech processor 12 linked to a plurality of speech recognition engines 14 and user interfaces 16, for example, a plurality of user workstations. The construction and design of the system 10 provide for redundant use of a plurality of speech recognition engines 14 directly linked with the central speech processor 12. This permits expanded use of available resources in a manner which substantially improves the efficiency of the distributed speech recognition system 10.

The system 10 is provided with a dynamic monitoring agent 18 which dynamically monitors the effectiveness and availability of the various speech recognition engines 14 linked to the central speech processor 12. The dynamic monitoring agent 18 determines which of the plurality of speech recognition engines 14 linked to the central speech processor 12 is most appropriately utilized in conjunction with a specific job.

With reference to the architecture of the present system, and as mentioned above, the system generally includes a central speech processor 12 linked to, and controlling interaction with, a plurality of distinct speech recognition engines 14. The central speech processor 12 is adapted for receiving and transmitting speech files, and accordingly includes an input 21 for receiving speech files from system users and an output 23 for transmitting the speech files (with appropriate appended information) to the variety of speech recognition engines 14 linked to the central speech processor 12. Inputs and outputs such as these are well known in the art, and those skilled in the art will certainly appreciate the many possible variations in constructing appropriate inputs and outputs. In accordance with a preferred embodiment of the present invention, the speech files are WAV files input to the speech recognition engines 14 in a manner known to those skilled in the art.

The central speech processor 12 is responsible for the system 10 in total and is the main hub of the system 10. It is designed to allow maximum flexibility. The speech processor 12 handles messaging to and from workstation clients, database maintenance, system monitoring, auditing, and corrected text submission for the recognition engines 14. The corrected text submitted for recognition is initially provided to the central speech processor 12 by the text processor 20 (after review by a transcriptionist) which submits converted text files for comparison with the prior speech files. When such a text file is submitted for text correction, the central speech processor 12 verifies that the text file has an associated speech file which was previously subjected to speech recognition. If no such speech file is located, the text file is deleted and is not considered. If, however, the text file resulted from the application of the speech recognition engine(s) 14, the corrected text file is forwarded to the appropriate speech recognition engine 14 and is evaluated by the speech recognition engine 14 to enhance future transcriptions.

All workstations are required to log onto the central speech processor 12 in one way or another. The central speech processor 12 is the only component communicating with all external applications, including, but not limited to a voice processor 22, a text processor 20 and the speech recognition engine wrappers 24. The voice processor 22 has been specifically designed with an interface 26 adapted for use in conjunction with the speech recognition engines 14. The interface 26 is adapted to place speech files into a specific state; for example, where a speech file has been reviewed and transcribed, the interface will properly note the state of such a speech file. As will be discussed below in greater detail, the voice processor 22 includes both server and client functionalities, while the text processor 20 includes only server functionality.

All fixed system configurations are set in the registry 28 of the central speech processor 12. All runtime system configurations and user configuration settings are stored in the database 30 of the central speech processor 12. The central speech processor 12 looks at the registry 28 settings only at startup so all information that is subject to change must be stored in the database 30.

As mentioned above, the central speech processor 12 includes a dynamic monitoring agent 18. The dynamic monitoring agent 18 directs the central speech processor 12 as to where and when all jobs should be submitted to the speech recognition engines 14. The dynamic monitoring agent 18 functions by assigning a weighting factor to each of the speech recognition engines 14 operating in conjunction with the present system. Specifically, the operating speed of each speech recognition engine processor is monitored and known by the dynamic monitoring agent 18. For example, a speech recognition engine 14 capable of processing 1 minute of a speech file in 2 minutes time will be give a weighting factor of 2 while a speech recognition engine 14 capable of processing 1 minute of a speech file in 3 minutes will be given a weighting factor of 3. The weighting factors are then applied in conjunction with the available queued space in each of the speech recognition engines 14 to determine where each new speech file should be directed for processing.

In addition, it is contemplated that the dynamic monitoring agent 18 may monitor the availability of speech recognition engines 14 in assigning jobs to various recognition engines 14. For example, if a speech recognition engine 14 is not responding or has failed a job for some reason, the job is submitted to the next engine 14 or none at all. The central speech processor 12 is also responsible for database back-up and SOS when necessary.

It is further contemplated that the dynamic monitoring agent 18 may monitor the efficiency of certain speech recognition engines 14 in handling speech files generated by specific users or by users fitting a specific profile. Such a feature will likely consider the language models and acoustic models employed by the various speech recognition engines 14. For example, the dynamic monitoring agent 18 may find that a specific speech recognition engine 18 is very efficient at handling users within the field of internal medicine and this information will be used to more efficiently distribute work amongst the various speech recognition engines 18 which might be connected to the central speech processor 12.

The central speech processor 12 further includes a dispatch system 32 controlling the transmission of speech files to the plurality of speech recognition engines 14 in a controlled manner. The dispatch system 32 is further linked to the dynamic monitoring agent 18 which monitors the activity of each of the speech recognition engines 14 linked to the central speech processor 12 and performs analysis of their activity for use in assigning speech files to the plurality of speech recognition engines 14. Using this information, the dynamic monitoring agent 18 and dispatch system 32 work together to insert new jobs into appropriate queues 34 of the speech recognition engines 14, submit the work based upon priority and bump the priority level up when a job has been sitting around too long. The dispatch system 32 and dynamic monitoring agent 18 work in conjunction to ensure that speech files are sent to the variety of available speech recognition engines 14 in a manner which optimizes operation of the entire system 10.

For example, the dynamic monitoring agent 18 identifies speech recognition engines 14 most proficient with specific vocabularies and instructs the dispatch system 32 to forward similar speech files to those speech recognition engines 14 best suited for processing of the selected speech file. The dynamic monitoring agent 18 will also ascertain the fastest processing speech recognition engines 14 and instruct the dispatch system 32 to forward high priority speech files to these speech recognition engines 18.

In summary, the central speech processor 12 includes, but is not limited to, functionality for performing the following tasks:

Service the Workstations. Logons, work submission, status updates to the client. (Web based)

Handle Error conditions in the event a cluster stops responding.

Database backup.

Trace dump maintenance.

Auditor Database maintenance.

Corrected text acceptance and submittal.

Keep track of the state of any work.

Submit recognized work to the voice processor.

Control submission of jobs to the speech recognition engines.

It is contemplated that users of the present system 10 may input files via a local PABX wherein all of the files will be recorded locally and then transferred via the Internet to the central speech processor 12. For those users who are not able to take advantage of the PABX connection, they may directly call the central speech processor 12 via conventional landlines. It may further be possible to use PC based dictation or handheld devices in conjunction with the present system.

The speech files stored by the central speech processor 12 are the dictated matters prepared by users of the present system. A variety of recording protocols maybe utilized in recording the speech files. Where a user produces sufficient dictation that it is warranted to provide a local system for the specific user, two protocols are contemplated for use. Specifically, it is contemplated that both ADPCM, adaptive differential pulse code modulation, (32 kbit/s, Dictaphone proprietary) and PCM, pulse code modulation, (64 kbits/s) may be utilized. Ultimately, all files must be converted to PCM for speech recognition activities, although the use of ADPCM offers various advantages for preliminary recording and storage. Generally, PCM is required by current speech recognition application but requires substantial storage space and a larger bandwidth during transmission, while ADPCM utilize smaller files in storing the recorded speech files and requires less bandwidth for transmission. With this in mind, the following option are contemplated for use where a user produces sufficient dictation that it is warranted to provide a local system for the specific user:

a) always record in PCM format regardless if job is used for manual transcription or speech recognition.

pros: easy to setup, identical for all installations, no change when customer is changed from manual transcription to speech recognition
   cons: no speed up/slow down, double file size (local hard disk space, transfer to Data Center)

b) record in ADPCM format for customers/authors which are not using the speech recognition
   pros: speed up/slow down, smaller file
   cons: higher effort for configuration at customer (especially when users are switched to recognition the customer site has to be reconfigured)

c) record always in PCM but immediately transcode to ADPCM (for local storage)
   pros: very small file (19 kbits/s) for transfer to Data Center, no transcoding needed in Data Center for speech recognition, speed up/slow down
   cons: needs CPU power on customer site for transcoding (may reduce maximum number of available telephone ports).

In accordance with a preferred embodiment of the present invention, a workstation 31 is utilized for PC based dictation. As the user logs in the login information, the information is forwarded to the central speech processor 12 and the user database 30a maintained by the central speech processor 12 is queried for the user information, configuration and permissions. Upon completion of the user login, the user screen will be displayed and the user is allowed to continue. The method of dictation is not limited to the current Philips or Dictaphone hand microphones. The application is written to allow any input device to be used. The data login portion of the workstation is not compressed to allow maximum speed. Only the recorded voice is compressed to keep network traffic to a minimum. Recorded voice is in WAV format at some set resolution (32K or 64K . . . ) which must be configured before the workstation application is started.

In accordance with an alternate transmission method, speech files may be recorded and produced upon a digital mobile recording device. Once the speech file is produced and compressed, it may be transmitted via the Internet in much that same manner as described above with PC based dictation.

The speech recognition engines 14 may take a variety of forms and it is not necessary that any specific combination of speech recognition engines 14 be utilized in accordance with the present invention. Specifically, it is contemplated that engines 14 from different manufacturers may be used in combination; for example, those from Phillips may be combined with those of Dragon Systems and IBM. In accordance with a preferred embodiment of the present invention, Dragon System's speech recognition engine 14 is being used. Similarly, the plurality of speech recognition engines 14 may be loaded with differing language models. For example, where the system 10 is intended for use in conjunction with the medical industry, it well known that physicians of different disciplines utilize different terminology in their day to day dictation of various matters. With this in mind, the plurality of speech recognition engines 14 may be loaded with language models representing the wide variety of medical disciplines, including, but not limited to, radiology, pathology, disability evaluation, orthopedics, emergency medicine, general surgery, neurology, ears, nose & throat, internal medicine and cardiology.

In accordance with a preferred embodiment of the present invention, each speech recognition engine 14 includes a recognition engine interface 35, voice recognition logical server 36 which recognizes telephony, PC or handheld portable input and various functional servers selectively activated and deactivated to provide functionality to the overall speech recognition engine 14. Specifically, each speech recognition engine 14 within the present system is provided with the ability to offer a variety of functionalities which are selectively and dynamically adapted to suit the changing needs of the overall distributed speech recognition system 10. In accordance with a preferred embodiment of the present invention, the plurality of servers include an acoustic adaptation logical server 38 which adapts individual user acoustic reference files, a language model adaptation logical server 40 which modifies, adds or formats words, a speech recognition server 42 which performs speech recognition upon speech files submitted to the speech recognition engine, a language model identification server 43 and a fluency server 45 which functions to determine the quality of a speaker using the present system 10. As those skilled in the art will appreciate, a fluency server 45 grades the quality of the user's speaking voice and places them into various categories for processing. While specific functional servers are disclosed in accordance with a preferred embodiment of the present invention, specific servers may be removed where those skilled in the art determine they are no longer necessary and additional servers may be included in the system 10 where those skilled in the art determine that the functionalities of such servers will enhance the present distributed speech recognition system 10.

Effective use of the various functional servers of each speech recognition engine 14 allow administrators of the present distributed speech recognition system to effectively utilize the servers of the speech recognition engines 14 to optimize the overall performance of the present distributed speech recognition system 10. With this in mind, the present system 10 is provided with a speech engine monitoring agent 52. The speech engine monitoring agent 52 maintains records relating to the specific speech recognition engine server resources used in operation of the present distributed speech recognition system 10. For example, the speech engine monitoring agent 52 will record the usage of the acoustic adaptation logical server 38, the language model adaptation logical server 40, the speech recognition server 42, the language model identification server 43 and the fluency server 45. The usage of these resources is then evaluated to determine the servers within the various speech recognition engines 14 which should be activated for usage in accordance with the present invention.

By way of example, we shall assume a distributed speech recognition system 10 includes ten speech recognition engines 14. At the inception of the system many new users will be accessing the system and requiring services necessary to initialize use of the present system 10. As such, it will be desirable to provide additional speech recognition engines 14 for acoustic adaptation and language model adaptation. Therefore, the original configuration might include 3 speech recognition engines with the acoustic adaptation logical server 38 activated for usage, 3 speech recognition engines with the language model adaptation server 40 activated for usage, 2 speech recognition engines with the speech recognition server 42 activated for usage and 2 other speech recognition engines respectively activated for the language model identification server 43 and the fluency server 45.

After time passes and the new users are fully established on the distributed speech recognition system 10, the need for acoustic adaptation and language model adaptation will likely be reduced. Some of the resources previously assigned to these functions may, therefore, be switched over to perform the additional speech recognition developed as the users become more and more familiar with the system 10. As such, two of the speech recognition engines providing acoustic adaptation may be switched over to provide speech recognition and two of the speech recognition engines providing language model adaptation may be switched over to provide speech recognition. The new system will include 1 speech recognition engine with the acoustic adaptation logical server 38 activated for usage, 1 speech recognition engine with the language model adaptation server 40 activated for usage, 6 speech recognition engines with the speech recognition server 42 activated for usage and 2 other speech recognition engines respectively activate for the language model identification server 43 and the fluency server 45.

Dynamic and selective activation of the various servers maintained in each of the speech recognition engines 14 is facilitated by an administrative workstation 54 linked to both the speech engine monitoring agent 52 and the speech processor 12 itself. The administrative workstation 54 functions to allow an administrator to selectively deactivate and activate the various servers maintained on each of the speech recognition engines 14 linked to the speech processor 12 in accordance with the present invention.

While a preferred embodiment of the present invention relies upon manual activation and/or deactivation of the various servers maintained on each of the speech recognition engines for optimizing the operation of the present system, it is contemplated that activation and deactivation may be automated to work through the speech engine monitoring agent without the need for an administrator intervention to determine appropriate changes to be made in optimizing the system based upon changes in usage.

Direct connection and operation of the plurality of distinct speech recognition engines 14 with the central speech processor 12 is made possible by first providing each of the speech recognition engines 14 with a speech recognition engine wrapper 24 which provides a uniform interface for access to the various speech recognition engines 14 utilized in accordance with the present invention.

The use of a single central speech processor 12 as a direct interface to a plurality of speech recognition engines 14 is further implemented by the inclusion of linked databases storing both the user data 30*a* and speech files 30*b*. In accordance with a preferred embodiment of the present invention, the database 30 is an SQL database although other database structures maybe used without departing from the spirit of the present invention. The user data 30*a* maintained by the database 30 is composed of data relating to registered users of the system 10. Such user data 30*a* may include author, context, priority, and identification as to whether dictation is to be used for speech recognition or manual transcription. The user data 30*a* also includes an acoustic profile of the user.

The speech recognition engine wrappers 24 utilized in accordance with the present invention are designed so as to normalize the otherwise heterogeneous series of inputs and outputs utilized by the various speech recognition engines 14. The speech recognition engine wrappers 24 create a common interface for the speech recognition engines 14 and provide the speech recognition engines 14 with appropriate inputs. The central speech processor 12, therefore, need not be programmed to interface with each and every type of speech recognition engine 14, but rather may operate with the normalized interface defined by the speech recognition engine wrapper 24.

The speech recognition engine wrapper 24 functions to isolate the speech recognition engine 14 from the remainder of the system. In this way, the speech recognition engine wrapper 24 directly interacts with the central speech processor 12 and similarly directly interacts with its associated speech recognition engine 14. The speech recognition engine wrapper 24 will submit a maximum of 30 audio files to the speech recognition engine 14 directly and will monitor the speech recognition engine 14 for work that is finished with recognition. The speech recognition engine wrapper 24 will then retrieve the finished work and save it in an appropriate format for transmission to the central speech processor 12.

The speech recognition engine wrapper 24 will also accept all work from the central speech processor 12, but only submits a maximum of 30 jobs to the associated speech recognition engine 14. Remaining jobs will be kept in a queue 34 in order of priority. If a new job is accepted, it will be put at the end of the queue 34 for its priority. Work that has waited will be bumped up based on a time waited for recognition. When corrected text is returned to the speech recognition engine wrapper 24, it will be accepted for acoustical adaptation. The speech recognition engine wrapper 24 further functions to create a thread to monitor the speech recognition engine 14 for recognized work completed with a timer, create an error handler for reporting status back to the central speech processor 12 so work can be rerouted, and accept corrected text and copy it to a speech recognition engine 14 assigned with acoustical adaptation functions.

As briefly mentioned above, the central speech processor 12 is provided with an audit system 44 for tracking events taking place on the present system. The information developed by the audit system 44 may subsequently be utilized by the dynamic monitoring agent 18 to improve upon the efficient operation of the present system 10. In general, the audit system 44 monitors the complete path of each job entering the system 10, allowing operators to easily retrieve information concerning the status and progress of specific jobs submitted to the system. Auditing is achieved by instructing each component of the present system 10 to report back to the audit system 44 when an action is taken. With this in mind, the audit system 44 in accordance with a preferred embodiment of the present invention is a separate component but is integral to the operation of the overall system 10.

In accordance with a preferred embodiment of the present system 10, the audit system 44 includes several different applications/objects: Audit Object(s), Audit Server, Audit Visualizer and Audit Administrator. Information is stored in the central speech processor SQL database. Communication is handled via RPC (remote procedure call) and sockets. RPC allows one program to request a service from a program located in another computer in a network without having to understand network details. RPC uses the client/server model. The requesting program is a client and the service providing program is the server. An RPC is a synchronous operation requiring the requesting program to be suspended until the results of the remote procedure are returned. However, the use of lightweight processes or threads that share the same address space allows multiple RPCs to be performed concurrently.

Each event monitored by the audit system 44 will contain the following information: Date/Time of the event, speech recognition engine and application name, level and class of event and an explaining message text for commenting purposes.

On all applications of the present system, an Audit Object establishes a link to the Audit Server, located on the server hosting the central speech processor SQL database. Multiple Audit Objects can be used on one PC. All communications are handled via RPC calls. The Audit Object collects all information on an application and, based on the LOG-level sends this information to the Audit Server. The Audit Server can change the LOG-level in order to keep communication and storage-requirements at the lowest possible level. In case of a communication breakdown, the Audit Object generates a local LOG-file, which is transferred after re-establishing the connection to the Audit Server. The communication breakdown is reported as an error. A system wide unique identifier can identify each Audit Object. However, it is possible to have more than one Audit Object used on a PC The application using an Audit Object will have to comment all file I/O, communication I/O and memory operations. Additional operations can be commented as well.

From the Audit Objects throughout the system, information is sent to the Audit Server, which will store all information in the central speech processor SQL database. The Audit Server is responsible for interacting with the database. Only one Audit Server is allowed per system. The Audit Server will query the SQL database for specific events occurring on one or more applications. The query information is received from one or more Audit Visualizers. The result set will be sent back to the Audit Visualizer via RPC and/or sockets. Through the Audit Server, different LOG-levels can be adjusted individually on each Audit Object. In the final phase, the Audit Server is implemented as an NT server, running on the same PC hosting the SQL server to keep communication and network traffic low. The user interface to the server-functionalities is provided by the Audit Admin application. To keep the database size small, the Audit Server will transfer database entries to LOG files on the file server on a scheduled basis.

The Audit Visualizer is responsible for collecting query information from the user, sending the information to the Audit Server and receiving the result set. Implemented as a COM object, the Audit Visualizer can be reused in several different applications.

The Audit Admin provides administration functions for the Audit Server, allowing altering the LOG-level on each of the Audit Objects. Scheduling archive times to keep amount of information in SQL database as low as necessary.

In addition to the central speech processor 12 and the speech recognition engines 14, the dictation/transcription system in accordance with the present invention includes a voice server interface 46 and an administrator application 48. The voice server interface 46 utilizes known technology and is generally responsible for providing the central speech processor 12 with work from the voice processor 22. As such, the voice server interface 46 is responsible for connecting to the voice input device, getting speech files ready for recognition, receiving user information, reporting the status of jobs back to the central speech processor 12, taking the DEED chunk out of WAV speech files and creating the internal job structure for the central speech processor 12.

The administrator application 48 resides upon all workstations within the system and controls the system 10 remotely. Based upon the access of the administrator using the system, the administrator application will provide access to read, write, edit and delete functions to all, or only some, of the system functions. The functional components include, but are not limited to, registry set up and modification, database administration, user set up, diagnostic tools execution and statistical analysis.

The central speech processor 12 is further provided with a speech recognition engine manager 50 which manages and controls the speech recognition engine wrappers 24. As such, the speech recognition engine manager 50 is responsible for submitting work to speech recognition engine wrappers 24, waiting for recognition of work to be completed and keeping track of the time from submittal to completion, giving the central speech processor 12 back the recognized job information including any speech recognition engine wrapper 24 statistics, handling user adaptation and enrollment and reporting errors to the central speech processor 12 (particularly, the dynamic monitoring agent).

Once transcription via the various speech recognition engines 14 is completed, the text is transmitted to and stored in a text processor 20. The text processor 20 accesses speech files from the central speech processor 12 according to predetermined pooling and priority settings, incorporates the transcribed text with appropriate work type templates based upon instructions maintained in the user files, automatically inserts information such as patient information, hospital header, physician signature line and cc list with documents in accordance with predetermined format requirements, automatically inserts normals as described in commonly own U.S. patent application Ser. No. 09/877,254, entitled "Automatic Normal Report System", filed Jun. 11, 2001, which is incorporated herein by reference, automatically distributes the final document via fax, email or network printer, and integrates with HIS (hospital information systems), or other relevant databases, so as to readily retrieve any patient or hospital information needed for completion of documents. While the functions of the text processor 20 are described above with reference to use as part of a hospital transcription system, those skilled in the art will appreciate the wide variety of environments in which the present system may be employed.

The text processor 20 further provides a supply vehicle for interaction with transcriptionists who manually transcribe speech files which are not acoustically acceptable for speech recognition and/or which have been designated for manual transcription. Transcriptionists, via the text processor, also correct speech files transcribed by the various speech recognition engines. Once the electronically transcribed speech files are corrected, the jobs are sent with unique identifiers defining the work and where it was performed. The corrected text may then be forward to a predetermined speech recognition engine in the manner discussed above.

In summary, the text processor 20 is responsible for creating a server to receive calls, querying databases 30 based upon provided data and determining appropriate locations for forwarding corrected files for acoustic adaptation.

In general, the voice processor 22 sends speech files to the central speech processor 12 via remote procedure call; relevant information is, therefore, transmitted along the RPC calls issued between the voice processor 22 and the central speech processor 12. Work will initially be submitted in any order. It will be the responsibility of the central speech processor 12, under the control of the dynamic monitoring agent 18, to prioritize the work from the voice processor 22 which takes the DEED chunk out of a WAV speech file, to create the internal job structure as discussed above. It is, however, contemplated that the voice processor 22 will submit work to the central speech processor 12 in a priority order.

Data flows within the present system 10 in the following manner. The voice processor 22 exports an audio speech file in PCM format. A record is simultaneously submitted to the central speech processor 12 so an auditor entry can be made and a record created in the user database 30a. An error will be generated if the user does not exist.

The speech file will then be temporarily maintained by the central speech processor database 30 until such a time that the dynamic monitoring agent 18 and the dispatch system 32 determine that it is appropriate to forward the speech file and associated user information to a designated speech recognition engine 14. Generally, the dynamic monitoring agent 18 determines the workload of each speech recognition engine 14 and sends the job to the least loaded speech recognition engine 14. This is determined not only by the number of queued jobs for any speech recognition engine 14 but by the total amount of audio to recognize.

Jobs from the same user may be assigned to different speech recognition engines 14. In fact, different jobs from the same user may be processed at the same time due to the present system's ability to facilitate retrieval of specific user information by multiple speech recognition engines 14 at the same time. The ability to retrieve specific user information is linked to the present system's language adaptation method. Specifically, a factory language model is initially created and assigned for use to a specific speech recognition engine 14. However, each organization subscribing to the present system will have a different vocabulary which may be added to or deleted from the original factory language model. This modified language model is considered to be the organization language model. The organization language model is further adapted as individual users of the present system develop their own personal preferences with regard to the language being used. The organization language model is, therefore, adapted to conform with the specific individual preferences of users and a specific user language model is developed for each individual user of the present system. The creation of such a specific user language model in accordance with the present invention allows the speech recognition engines to readily retrieve information on each user when it is required.

The central speech processor 12 then submits the job to the speech recognition engine 14 and updates the database 30 record to reflect the state change. The user information (including language models and acoustic models) is submitted, with the audio, to the speech recognition engine wrapper 24 for processing. The speech recognition engine wrapper 24 will test the audio before accepting the work. If it does not pass, an error will be generated and the voice processor 22 will be notified to mark the job for manual transcription.

Once the speech recognition engine 14 completes the transcription of the speech file, the transcribed file is sent to the central speech processor 12 for final processing.

The speech recognition engine wrapper 24 then submits the next job in the queue 34 and the central speech processor 12 changes the state of the job record to reflect the recognized state. It then prepares the job for submission to the voice processor 22. The voice processor 22 imports the job and replaces the old audio file with the new one based on the job id generated by the central speech processor 12. The transcribed speech file generated by speech recognition engine 14 is saved.

When a transcriptionist retrieves the job and corrects the text, the text processor 20 will submit the corrected transcribed speech file to the central speech processor 12. The central speech processor 12 will determine which speech recognition engine 14 was previously used for the job and submits the transcriptionist corrected text to that speech recognition engine 14 for acoustical adaptation in an effort to improve upon future processing of that users jobs. The revised acoustical adaptation is then saved in the user's id files maintained in the central speech processor database 30 for use with subsequent transcriptions.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A distributed speech recognition system, comprising:
a speech processor linked to a plurality of speech recognition engines, the speech processor includes an input for receiving speech files from a plurality of users and storage means for storing the received speech files until such a time that they are forwarded to a selected speech recognition engine for processing;
each of the speech recognition engines includes a plurality of servers selectively performing different functions; and
means for selectively activating or deactivating the plurality of servers based upon usage of the distributed speech recognition system.

2. The distributed speech recognition engine according to claim 1, wherein the plurality of servers are selected from the group consisting of an acoustic adaptation logical server, a language model adaptation logical server, a speech recognition server, a language model identification server and a fluency server.

3. The distributed speech recognition engine according to claim 1, wherein the servers include a speech recognition server and an acoustic adaptation logical server.

4. The distributed speech recognition engine according to claim 1, wherein the servers include a speech recognition server and a language model adaptation logical server.

5. The distributed speech recognition engine according to claim 1, wherein the servers include a speech recognition server and a language model identification server.

6. The distributed speech recognition engine according to claim 1, wherein the servers include a speech recognition server and a fluency server.

7. The distributed speech recognition engine according to claim 1, wherein the means for activating or deactivating includes an administrator workstation.

8. The distributed speech recognition engine according to claim 1, further including a speech engine monitoring agent monitoring usage of the plurality of speech recognition engines.

9. The distributed speech recognition engine according to claim 8, wherein the means for activating or deactivating includes an administrator workstation.

10. The distributed speech recognition engine according to claim 9, wherein the plurality of servers are selected from the group consisting of an acoustic adaptation logical server, a language model adaptation logical server, a speech recognition server, a language model identification server and a fluency server.

11. A method for optimizing the operation of a distributed speech recognition system, comprising the following steps:
linking a speech processor to a plurality of speech recognition engines, the speech processor including an input for receiving speech files from a plurality of users and storage means for storing the received speech files until such a time that they are forwarded to a selected speech recognition engine for processing;
providing each of the speech recognition engines with a plurality of servers performing different functions; and
selectively activating or deactivating the plurality of servers based upon usage of the distributed speech recognition system.

12. The method according to claim 11, wherein the plurality of servers are selected from the group consisting of an acoustic adaptation logical server, a language model adaptation logical server, a speech recognition server, a language model identification server and a fluency server.

13. The method according to claim 11, wherein the servers include a speech recognition server and an acoustic adaptation logical server.

14. The method according to claim 11, wherein the servers include a speech recognition server and a language model adaptation logical server.

15. The method according to claim 11, wherein the servers include a speech recognition server and a language model identification server.

16. The method according to claim 11, wherein the servers include a speech recognition server and a fluency server.

17. The method according to claim 11, wherein the means for activating or deactivating includes an administrator workstation.

18. The method according to claim 11, further including a speech engine monitoring agent monitoring usage of the plurality of speech recognition engines.

19. The method according to claim 18, wherein the step of activating or deactivating is performed by an administrator workstation associated with the speech processor.

20. The method according to claim 19, wherein the plurality of servers are selected from the group consisting of an acoustic adaptation logical server, a language model adaptation logical server, a speech recognition server, a language model identification server and a fluency server.

* * * * *